United States Patent [19]

Winchell

[11] 4,065,144
[45] Dec. 27, 1977

[54] CAMBERING VEHICLE

[75] Inventor: Frank J. Winchell, Orchard Lake, Mich.

[73] Assignee: General Motors Corporation, Detroit, Mich.

[21] Appl. No.: 603,532

[22] Filed: Aug. 11, 1975

[51] Int. Cl.² .................................... B60G 19/00
[52] U.S. Cl. ............................ 280/771; 180/27; 280/112 A
[58] Field of Search .............. 280/87 R, 282, 283, 280/111, 112 R, 112 A, 87.04 A, 21 A, 43, 6, 104; 180/26 R, 41

[56] References Cited

U.S. PATENT DOCUMENTS

| 2,152,938 | 4/1939 | Welch | 280/112 A |
|---|---|---|---|
| 2,609,884 | 9/1952 | Garcia-Cambra | 180/41 |
| 2,696,387 | 12/1954 | Nordin | 280/282 |
| 2,887,322 | 5/1959 | De Monge | 280/104 |
| 2,936,034 | 5/1960 | Van Der Lely et al. | 180/41 |
| 3,014,731 | 12/1961 | Dworak | 280/282 |
| 3,123,375 | 3/1964 | Courtney | 280/21 A |
| 3,237,961 | 3/1966 | McMullen | 280/282 |
| 3,504,934 | 4/1970 | Wallis | 280/282 |
| 3,540,750 | 11/1970 | Berger | 280/16 |
| 3,572,456 | 3/1971 | Healy | 280/112 A X |
| 3,637,035 | 11/1969 | Washburn | 180/41 |
| 3,645,558 | 2/1972 | McMullen | 280/270 |
| 3,860,264 | 1/1975 | Douglas et al. | 280/282 X |
| 3,924,704 | 12/1975 | Lindblom et al. | 180/41 |
| 3,964,563 | 6/1976 | Allen | 180/41 X |

FOREIGN PATENT DOCUMENTS 4,942,586  1974  Japan .................... 280/275

Primary Examiner—Joseph F. Peters, Jr.
Assistant Examiner—Jack D. Rubenstein
Attorney, Agent, or Firm—Charles R. White

[57] ABSTRACT

A narrow track cambering vehicle having a steerable front wheel and a pair of laterally separated rear wheels suspended on trailing arms mounted for independent swinging movement in separate and parallel planes. The arms form part of a cambering system controlled by cables and tillers actuated by foot pedals which allow the operator to vary vehicle camber independent of steering to maximize vehicle cornering through a wide range of turns at varying speeds.

6 Claims, 10 Drawing Figures

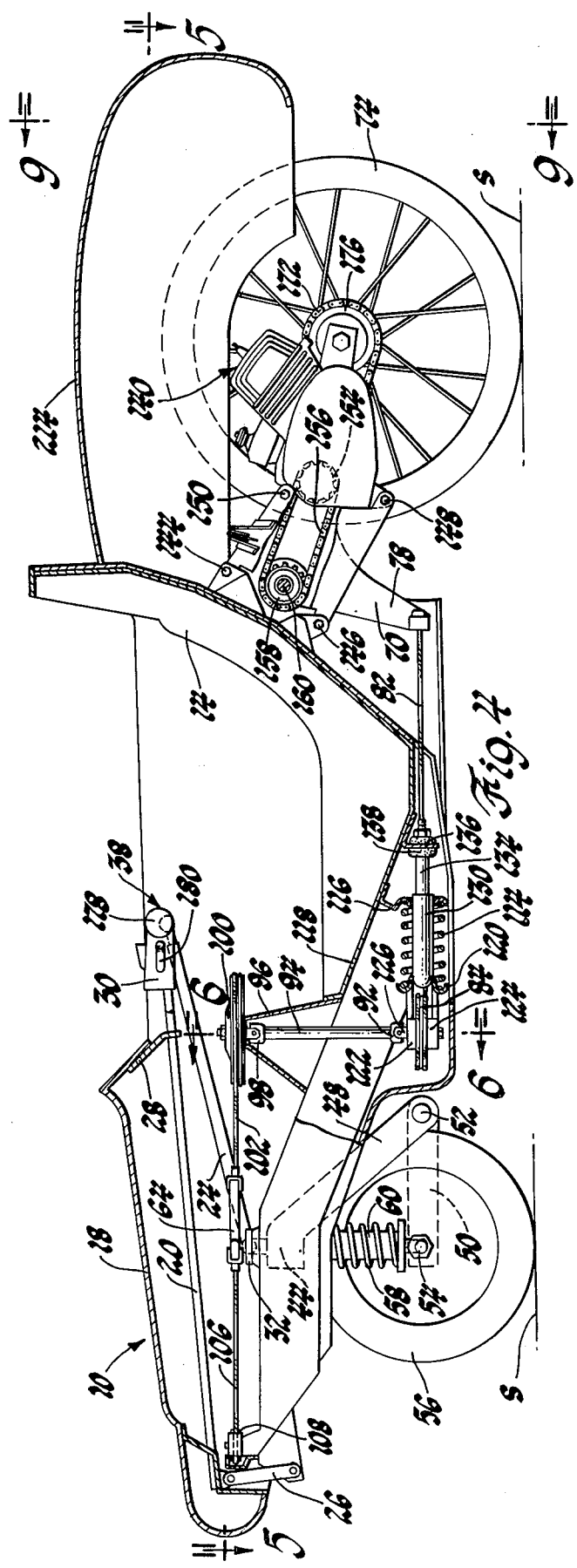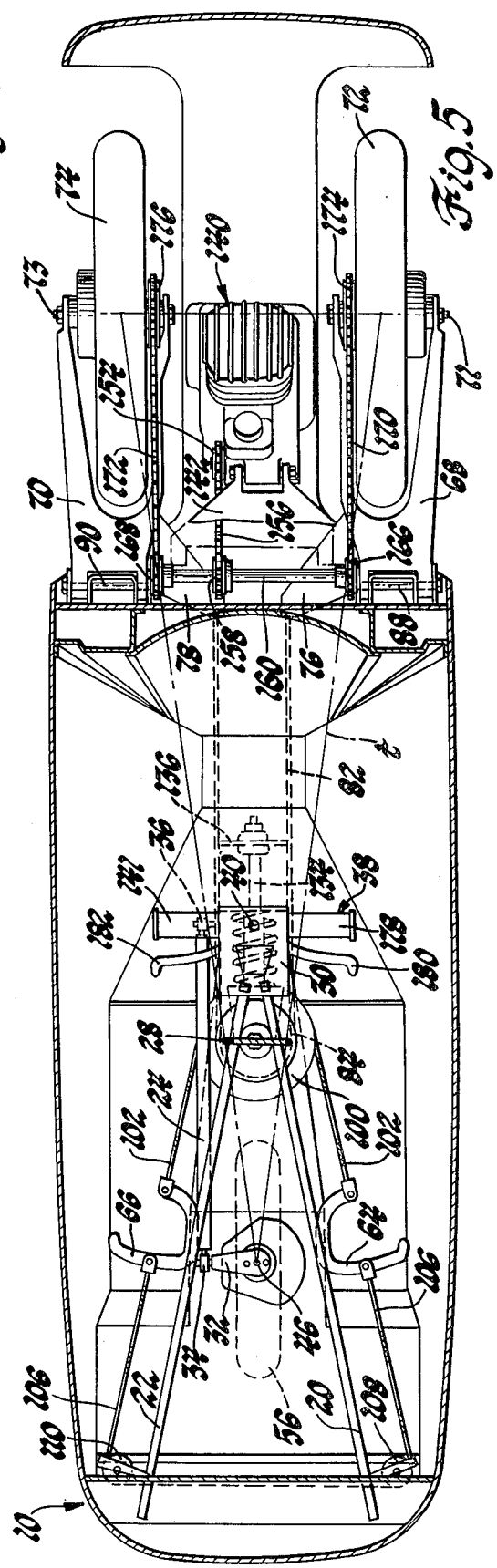

CAMBERING VEHICLE

This invention relates to a narrow track cambering vehicle with a minimum of three ground contact points independently suspended to provide a separate ride rate and substantially a zero roll rate. Two ground contact points are controlled by new and improved chamber actuator system which permits a vehicle operator to supply a banking moment to the vehicle and a restoring torque for dynamic cornering and for stationary balancing purposes.

In the preferred embodiment of this invention a cambering vehicle is provided with a main body, a steerable front wheel and a pair of rear wheels mounted on trailing arms that are independently swingable in separate and parallel planes. A vehicle operator seated in the vehicle operates a chamber control system which incorporates foot pedals operatively connected by cable and tiller construction that allows the driver to camber the vehicle and wheels and permits the driver to apply a restoring torque for dynamic banking and for stationary balancing. The low center of gravity provided by this vehicle materially reduces the restoring movement to compensate for any camber angle within design limits. The preferred seat and pedal arrangement allows the driver to use the back of the seat as a ground and extend one of his legs forwardly while retracting the other leg to maximize the use of his muscle power to provide the restoring torque.

With this invention the camber control system is preferably independent of the steering so that the vehicle and wheels can be cambered before entering a turn to eliminate the need of introducing a momentary steering input opposite to the direction of turn as with two wheel cambering vehicles such as bicycles and motorcycles as well as with three wheel cambering vehicles in which cambering is tied to vehicle steering.

Since this vehicle has a narrow body and the rear wheels are supported by the trailing arms longitudinally extending from the body, roadway space is efficiently used so that traffic congestion is reduced.

A particular feature of this invention is the provision of a cambering vehicle having independently suspended wheels that employ a single ride control spring that does not affect vehicle camber. With the ride rate independent of the roll rate and with the roll rate approaching zero the vehicle of this invention can be cambered and controlled with minimal driver effort. In addition to the above, the low center of gravity reduces frontal area to provide for improved streamlining of the vehicle to maximize efficiency.

Another feature, object and advantage of this invention is to provide a new and improved three point contact cambering vehicle with a unitary ride control spring and which has a roll rate which approaches a minimal roll rate and which is independent of the ride rate.

Another feature, object and advantage of this invention is to provide a new and improved narrow track cambering vehicle having a pair of wheels and independently supported by a pair of pivoted arms extending rearwardly from and within the profile of the body of the vehicle and interconnected in series with foot pedals of a cambering control system so that a controlled banking movement can be applied to the vehicle and so that a maximized restoring torque can be applied for dynamic banking and for stationary balance.

Another feature, object and advantage of this invention is to provide a new and improved three welded cambering vehicle having operator controlled cambering system independent of vehicle steering so that the vehicle can be cambered before turning so centrifugal forces do not have to be overcome for cambered turns. This invention further provides a low center of gravity so effort required to restore the vehicle to an upright position after such turns is minimized.

Another feature, object and advantage of this invention is to provide a new and improved suspension for a wheeled vehicle which incorporates a single ride control spring operatively connected to a pair of wheel suspension arms supported for independent pivotal movement with respect to the body of the vehicle.

These and other features, objects and advantages of this invention will become more apparent from the following detailed description and drawings in which:

FIG. 4 is a side elevational view partially in section of the preferred embodiment of the invention;

FIG. 5 is a plan view partly in section taken along lines 5—5 of FIG. 4;

Figure 1:
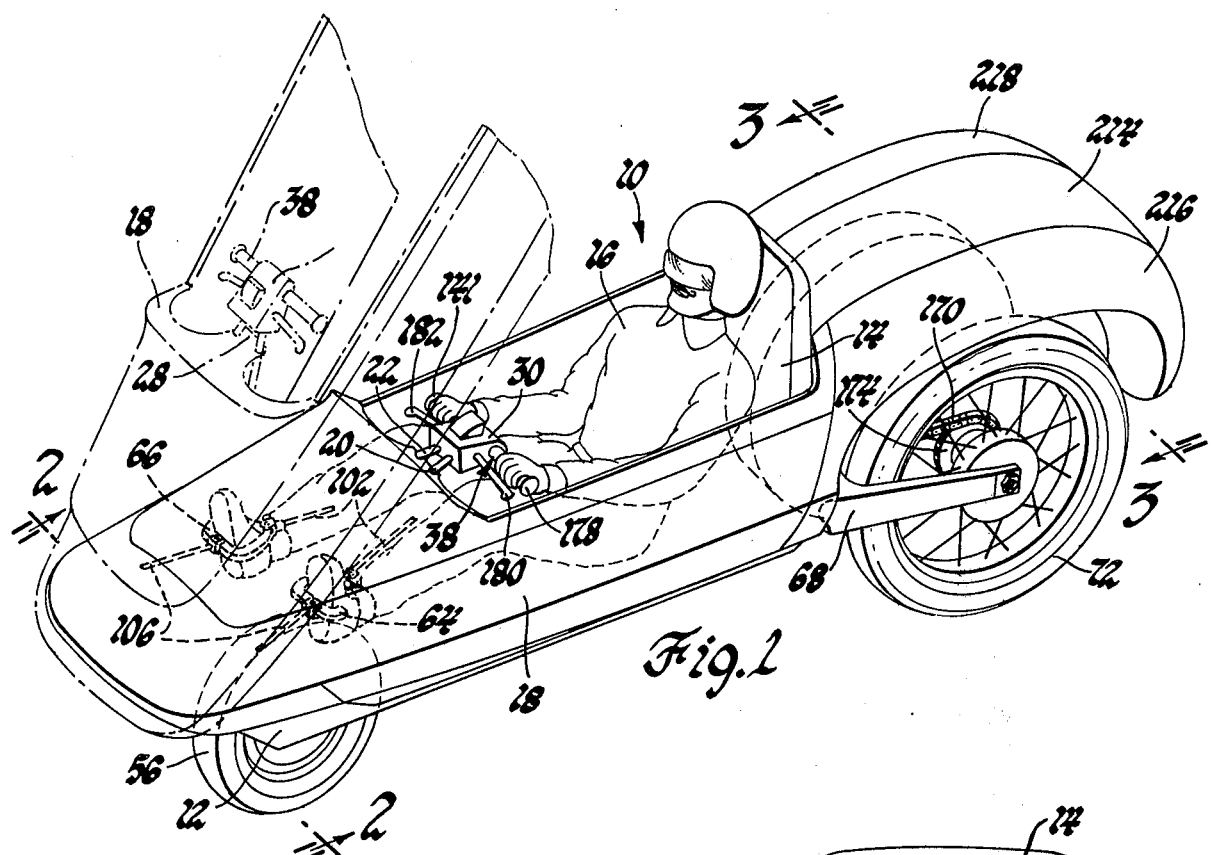
FIG. 1 is a perspective view of a preferred embodiment of this invention.
Figure 3:
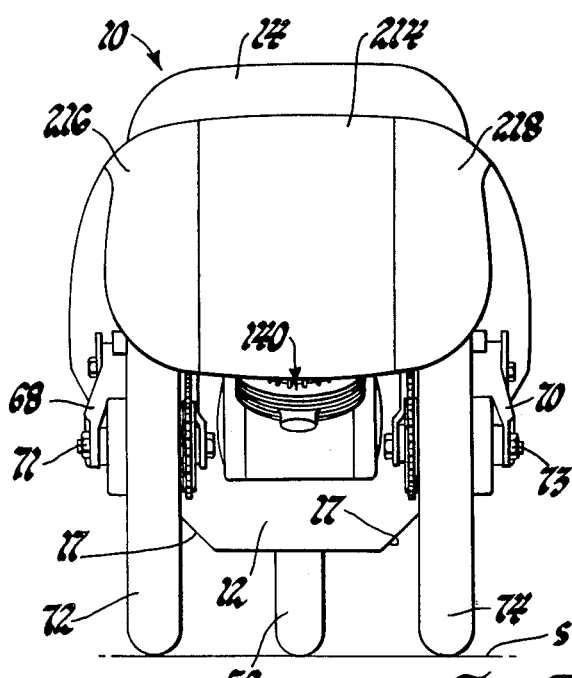
FIG. 3 is a rear end view of the preferred embodiment of this invention taken along lines 3—3 of FIG. 1.
Figure 2:
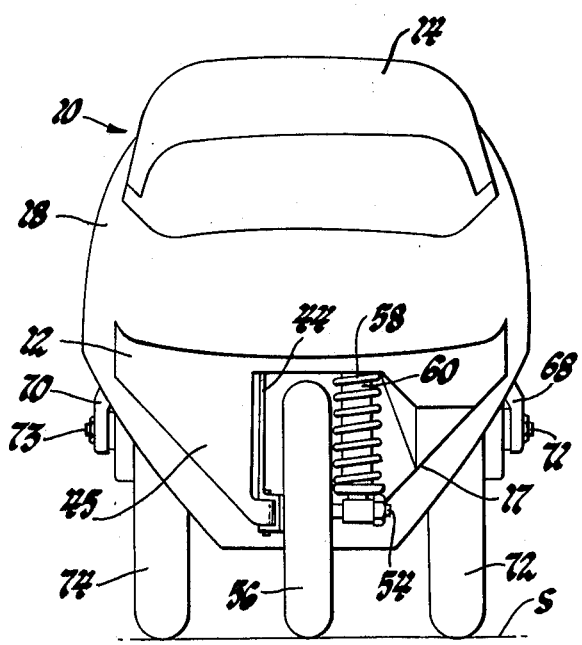
FIG. 2 is a front end view of the preferred embodiment of this invention taken along lines 2—2 of FIG. 1.
Figure 6:
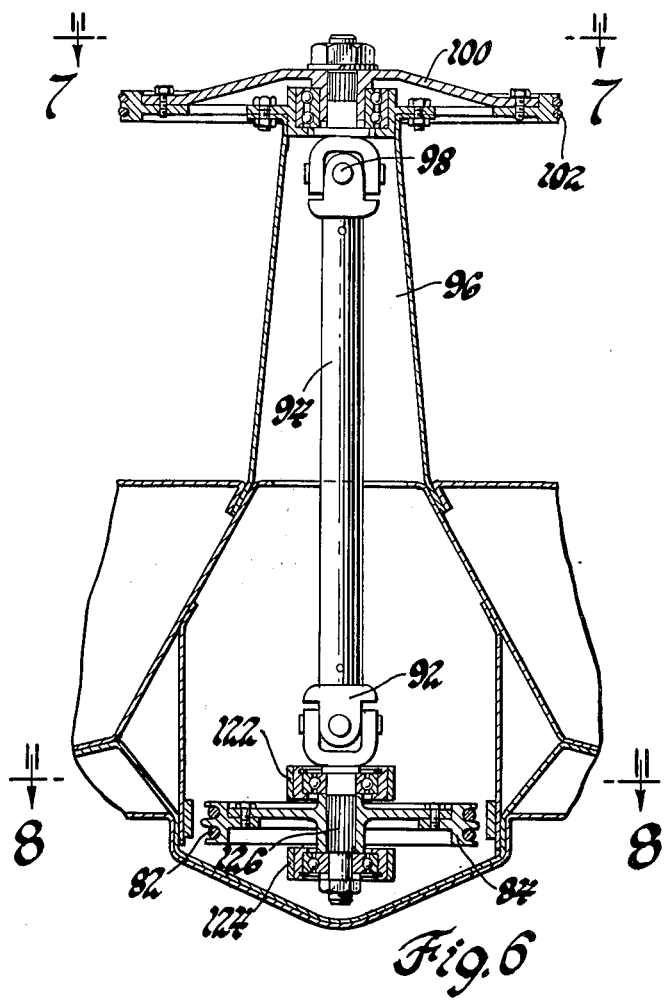
FIG. 6 is a cross sectional view taken along lines 6—6 of FIG. 4.

Turning now in greater detail to the drawing, there is shown in FIG. 1 a three-wheel cambering vehicle 10 with a unitized body 12 having a seat 14 supported therein for vehicle operator 16. The lower sides 17 of body 12 are inclined at a 45° angle to permit camber of the vehicle up to 45° during operation. The body 12 has a canopy 18 pivotally mounted on the front end thereof which can be raised and lowered to facilitate operator ingress and egress. The canopy 18 is a hood of sheet material which covers the front of the vehicle and extends from the front of the vehicle along the sides thereof and around the back rest of seat 14.

As shown the canopy is supported for limited pivotal movement with respect to the vehicle body between the full and phantom line positions by a linkage system comprising a pair of elongated metal struts 20 and 22 and by steering shaft 24. Struts 20 and 22 are pivotally connected at their front ends to support links 26 that in turn are pivotally connected to the body structure. The struts 20 and 22 converge as they extend rearwardly from the front of the vehicle through a bracket 28 extending downwardly from the canopy and are pivotally connected at their ends to a handlebar bracket 30. The steering shaft 24 is pivotally connected at its front end to a horizontally-extending steering arm 32 by a universal joint 34 while the rear end of the steering shaft 24 is pivotally connected to the handlebar bracket by universal joint 36. Handlebars 38 are supported by the handlebar bracket 30 for limited turning movement with respect to pivot 40. To raise the canopy for exiting from the vehicle, the operator grips the handlebars and pushes upwardly to thereby raise the canopy to the phantom line, over-center position. If the operator is in the vehicle and desires to close the canopy, the handlebars may be gripped and the canopy pulled downwardly to the full line position. A suitable locking mechanism, not shown, is used to secure the canopy in the closed position. The steering arm 32, actuated by steering shaft 24, is drivingly connected to a steering knuckle 44 that has upper and lower ear portions pivotally mounted on support bracket 45 integral with vehicle body 12 for limited turning movement with respect to a vertical steering axis 46. The steering knuckle 44 has a rearwardly inclined arm portion 48 to which a forwardly extending suspension control arm 50 is articulated by pivot pin 52. The suspension control arm 50 has at its forward end a spindle 54 secured thereto on which steerable front wheel 56 is rotatably mounted. Disposed outboard of the front wheel 56 is a coil suspension spring 58 operatively mounted between the spindle 54 and an upper portion of the steering knuckle 44. A direct acting shock absorber 60 mounted internally of spring 58 controls the movement of the spring 58 to improve vehicle roadability and handling characteristics.

With the steering structure described above, the handlebars 28 can be turned with respect to pivot 40 to actuate steering shaft 24 and thereby turn steering knuckle 44 and the steerable front wheel 56. The movement of front wheel 56 with respect to pivot 52 from road bumps and other irregularities is controlled by the suspension spring 58 in conjunction with the shock absorber 60.

When seated in the vehicle the legs of the operator extend forwardly and his feet may engage in left and right pedals or stirrups 64 and 66 as illustrated in FIG. 1 which form part of a manually actuated system to control vehicle camber. As best shown in FIGS. 4 and 5 this system incorporates a pair of trailing arms 68 and 70 which have rearwardly extending fork portions that support the axles 71 and 73 for rotatably mounting the rear wheels 72 and 74. The arms 68 and 70 have downwardly extending crank portions 76 and 78 that are connected respectively to the opposite ends of a cable 82 that is wrapped around and secured to a circular tiller 84 which is yieldably supported in a centralized location within the vehicle body 12 forward of the trailing arms 68 and 70.

The trailing arms 68 and 70 are pivotally mounted on body 12 by pivot bolt means 88 and 90 which permit the arms 68 and 70 to swing upwardly and downwardly in separate planes within the profile of the body and parallel to a plane through the longitudinal axis of the vehicle, when tiller 84 is turned as will be later described. The tiller 84 is operatively connected by universal joint 92 to a shaft 94 that extends upwardly into a conical support or tower 96 within the vehicle body 12. The upper end of shaft 94 is connected by universal joint 98 to an upper tiller 100 supported for rotation on the top of tower 96.

Figure 7:
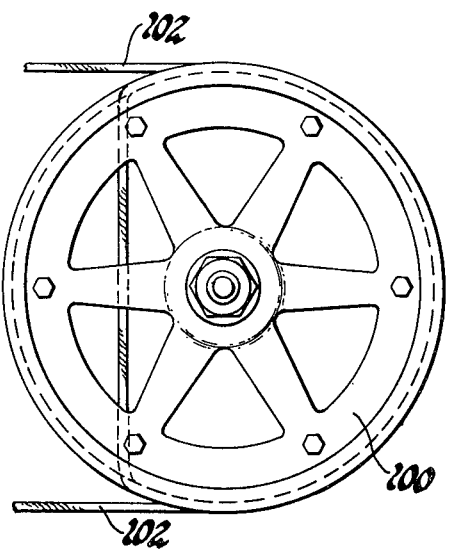
FIG. 7 is a top plan view taken along lines 7—7 of FIG. 6.
Figure 8:
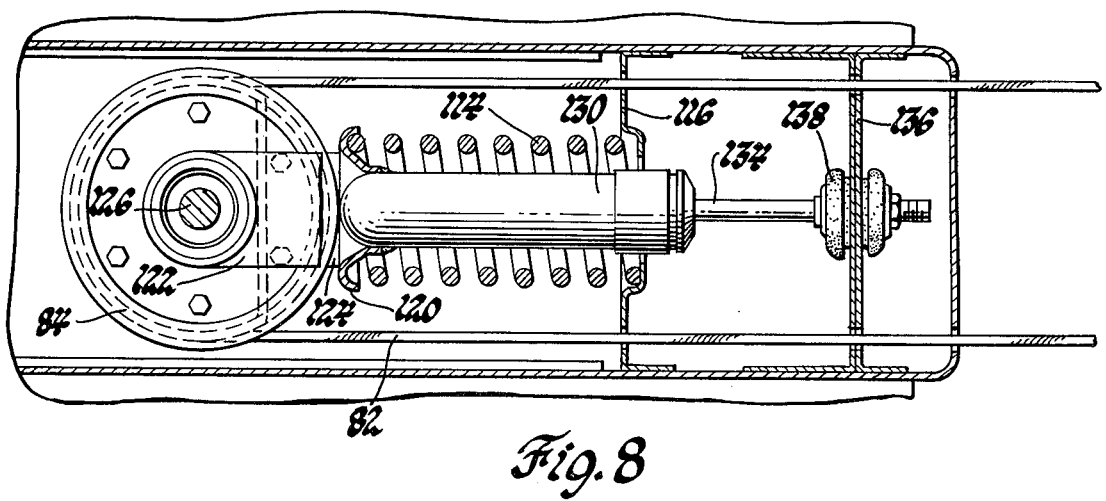
FIG. 8 is a sectional view taken along lines 8—8 of FIG. 6.

An upper cable 102, wrapped around and secured to second circular tiller 100 as shown in FIG. 7, has one end fastened to the left side stirrup 64 and the opposite end fastened to stirrup 66. Stirrups 64 and 66 are further interconnected by a front cable 106 which extend around left and right pulleys 108 and 110 rotatably supported in the vehicle body 12.

The lower tiller 84 is yieldably supported in position by a single ride control spring 114 which has one end seated on a depending flange 116 which projects from a lower panel 118 of the vehicle body. The forward end of spring 114 seats against a retainer 120 which has upper and lower arms 122 and 124 that extend around the central pivot shaft 126 of the tiller 84. When the wheels 72 and 74 rebound the trailing arms 68 and 70 acting through cable 82 displace tiller 84 rearwardly to compressively load spring 114. A shock absorber 130, disposed within spring 114 to dampen the ride imposed oscillations of the spring, has a cylinder tube welded or otherwise connected to retainer 120 and a piston rod 134 connected at one end to a flange 136 depending from body 12. This connection includes an elastomeric bump stop 138 to limit the inward telescoping stroke of shock absorber 130.

Figure 10:
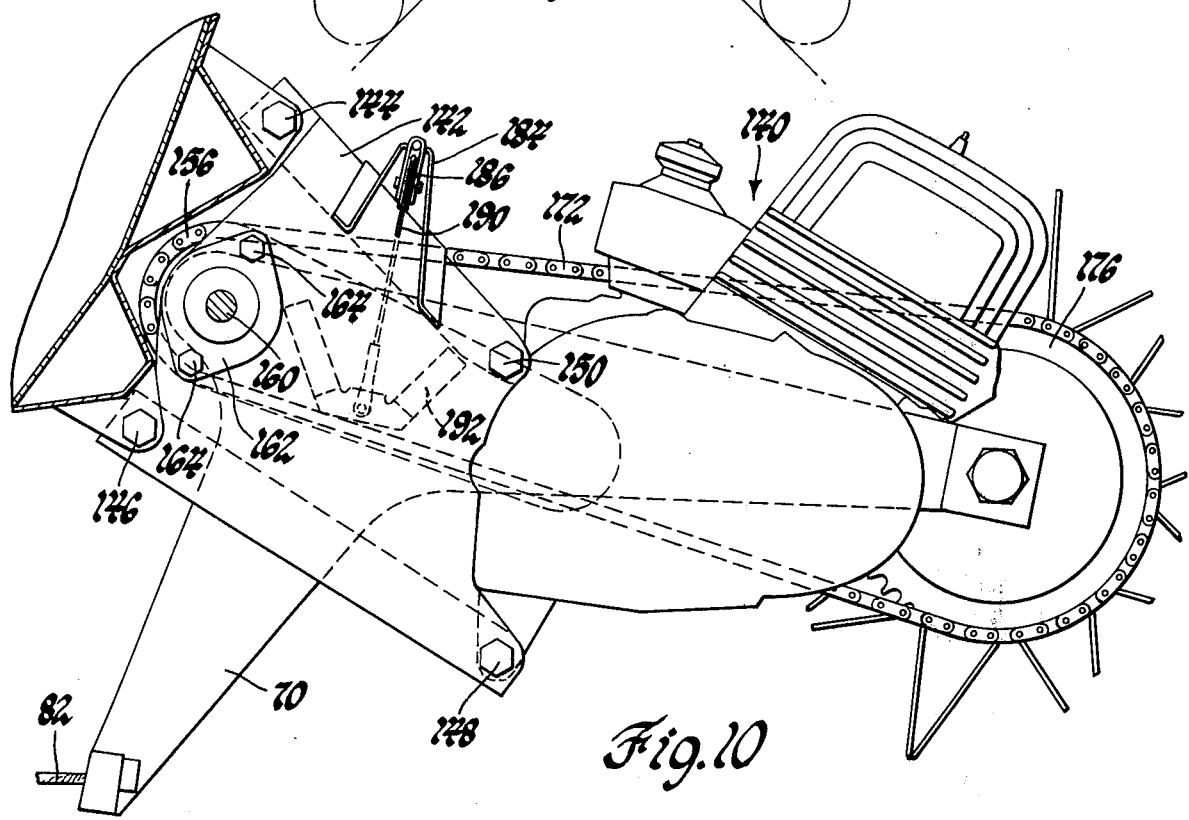
FIG. 10 is a side view taken along lines 10—10 of FIG. 9.

The vehicle is powered by an internal combustion engine 140 whose speed and torque is controlled by rotatable hand throttle 141 on handlebars 38. Engine 140 is mounted to vehicle body by a support bracket 142. As shown in FIG. 10 bracket 142 is secured by bolts 144 and 146 to the body of the vehicle and the engine in turn is secured to this bracket by suitable bolt means such as 148 and 150. The engine 140 is operatively connected to an output sprocket 154 by a change speed transmission, not shown. Sprocket 154 drives chain 156 which in turn drives a sprocket 158 fixed to jack shaft 160. Jack shaft 160 is rotatably mounted by suitable bearings in cup-like housings 162 secured by threaded fasteners 164 to engine mounting bracket 142. The jack shaft has left and right sprockets 166, 168 to drive left and right chains 170 and 172 respectively. The chains 170 and 172 respectively drive sprockets 174, 176 which are in turn connected to the left and right drive wheels 72 and 74. The gear ratios of the transmission are controlled by rotatable grip 178 on handlebars 38. Manual lever 180 forward of handlebars 38 controls a clutch actuated when shifting between gear ratios. Lever 182 pivotally supported on bracket 30 in front of throttle control 141 is manually gripped and squeezed to operate drum brakes not shown on all three wheels for vehicle braking.

Figure 9:
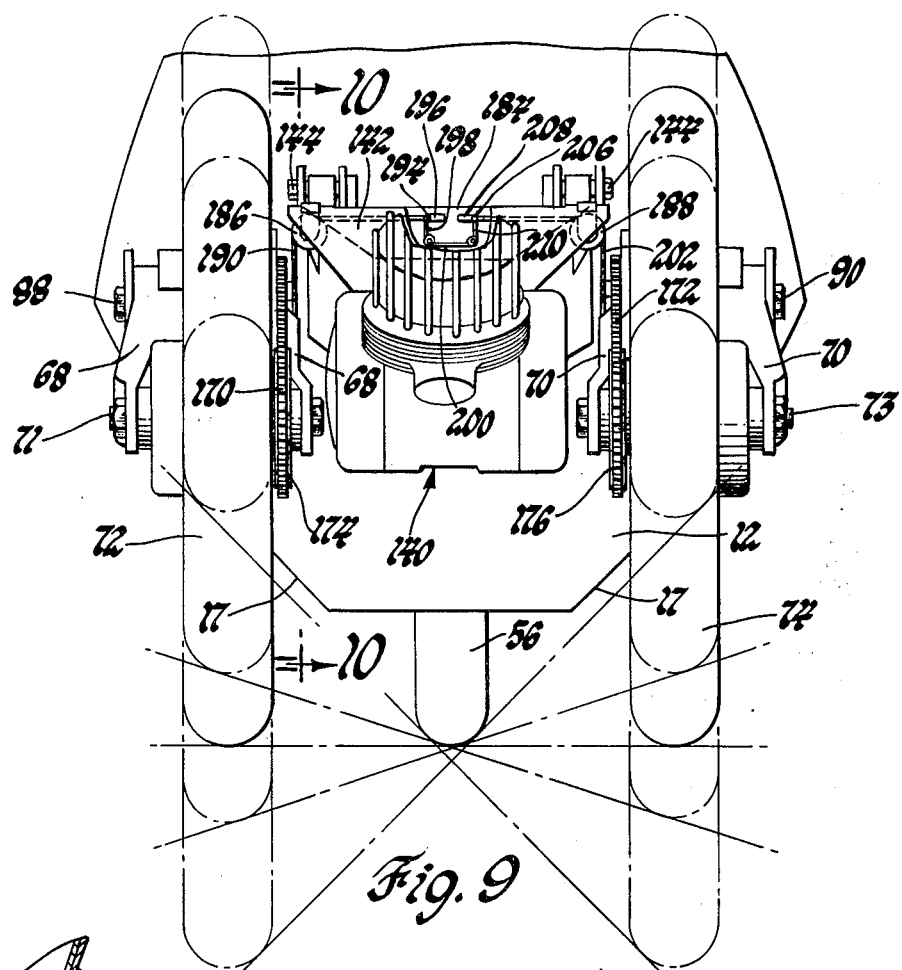
FIG. 9 is an end view taken along lines 9—9 of FIG. 4.

In the preferred embodiment of this invention, yieldable means are employed to limit the amount of downward travel of the trailing arms and wheels 72 and 74 such as may occur when the vehicle is traveling on rough terrain or bumper roadways. As shown in FIGS. 9 and 10 there is a bracket 184 secured to engine mounting bracket 142 which rotatably support left and right pulleys 186 and 188. A left side cable 190 extending over pulley 186 is fastened at one end by connector means 192 to trailing arm 68 and at the other end to a pin 194 slidable in slot 196 in bracket 184. The pin 194 is also connected to the end of an arm 198 of a spring device 200 which is centrally mounted on bracket 184. When the wheel 72 is jounced and trailing arm 68 moves upwardly the spring arm 196 folds inwardly to take up slack in cable 190. Rebound travel of trailing arm 68 and wheel 72 is limited when the cable 190 moves pin 194 to the end of the slot 196.

In a similar manner trailing arm 70 is connected by a right side cable 202 which extends over pulley 188 to a pin 206 in slot 208 in bracket 184. This pin is connected to arm 210 of the spring device 200. Operation of the right side cable and spring construction is the same as described in connection with wheel 72 and thus further description of such construction is not necessary.

A cover 214 extends rearwardly from the driver's seat 14 to cover engine 140. Suitable support and pivot means, not shown, at the rear of the cover are provided to permit the cover to be raised rearwardly to provide access to the engine, transmission and other components within the engine compartment. The cover 214 is held down by suitable latching means not illustrated. Left and right fenders 216 and 218 covering the rear wheels are secured to cover 214 and are raised and lowered along with the cover 214.

In operation the operator can readily steer this vehicle in a normal straight-ahead course or make a turn without camber since there is no rake angle in the front steering axis as shown by FIGS. 4 and 5. However, for improved stability and better cornering, the operator may impress loads on the trailing arms by actuating the stirrups 64 and 66 to turn the tillers 100 and 84 to camber the vehicle and wheels left or right as diagrammatically illustrated in FIG. 9. With the vehicle body shaped for maximized clearance of approximately 45° for cambering a high lateral acceleration potential, such as $lg$, is readily permitted. This permits the vehicle to make gradual or tight turns at a wide range of vehicle speeds.

With the operator seated in the vehicle, the center of gravity is quite low and above the triangle $t$ formed by the wheel contact points and the ground. This low center of gravity and the chamber control features of this invention provide for improved vehicle stability whether the vehicle is stationary, traveling a straight course, or making a cambered right or left corner. Maximized cornering ability is readily obtained by cambering the vehicle and wheels just prior to entering a turn. For example, in making a cambered right turn the operator extends his left leg to actuate the cables to turn the tillers 100 and 84. This action causes the cables 82 to move and turn the left arm 86 downwardly. This action rolls the vehicle to the right so that a subsequent steered and cambered right turn can be made. When the vehicle is rolled, all wheels remain in contact with the ground and cambered by an amount equal to the vehicle roll. The resultant force due to gravity and centrifugal force is directed through the triangular area $t$ so that a stabilized turn is made. In this vehicle there is no need to keep a precise relationship between speed, turning radius and cambered angle as with conventional vehicles so that severe handling maneuvers can be accomplished with ease and with minimal driving skills. Camber steering to the left requires opposite action as compared to right turn camber steering described above. In negotiating a cambered left turn the operator turns steerable front wheel 56 slightly to the left and pushes on strut 66 to turn the tillers 100 and 84 in a clockwise direction. This action activates cable 82 which forces swing arm 70 downwardly while allowing arm 68 to swing upwardly by an equal amount. The action of trailing arms using ground reaction rolls the vehicle about the roll axis and cambers the vehicle and the wheels to the left so that high speed left cornering is possible. The amount of chamber in both left and right turn operations is dependent upon the amount of movement of the stirrups and the movement of the control arm.

If turns with minimal vehicle and wheel camber are desired, stirrup displacement is quite small. As increasing camber is desired the amount of stirrup displacement is accordingly increased. In any event, cornering ability is maximized when the vehicle and wheels are cambered by an amount sufficient to offset lateral acceleration. The cambering feature further allows improved stationary balance and manual banking independent of steering allows said vehicle to be cambered prior to entering into a turn so that centrifugals do not have to be overcome during the turn.

With this invention, it will be appreciated that the ride control spring is independent of the roll control so that a zero roll rate can be approached. This is particularly important since the vehicle operator does not have to work against the ride control suspension spring to camber the vehicle. Additionally, the low center of gravity provided by this vehicle construction permits the operator to move the vehicle to the cambered or upright position with a minimized effort. The particular pedal and seat arrangement allows the maximized use of muscle power in controlling the camber angle of the vehicle. A suitable manually operated locking mechanism, not shown, may be employed to ground the upper tiller to the vehicle body to hold the trailing arms 68 and 70 stationary to stabilize the vehicle for parking.

While preferred embodiments of this invention have been shown and described to illustrate the invention, other embodiments will now be apparent to those skilled in the art. Accordingly, the scope of this invention is set forth in the following claims:

I claim:

1. A three wheel cambering vehicle comprising a vehicle body, steerable wheel means movably secured to said body for turning movement about a steering axis, steering means for turning said steerable wheel means, a pair of arms extending longitudinally of said body, pivot means independently mounting each of said arms for upward and downward swinging movement with respect to said body, a road wheel rotatably mounted on each of said arms for swinging movement therewith, seat means for supporting a vehicle operator in said body at a low center of gravity with respect to a supporting roadway, force transmitting means independent of said steering means operatively connected to each of said arms and actuated by said vehicle operator to permit the vehicle operator to selectively impress a load to turn either of said trailing arms on said pivot means to camber said wheels and said vehicle, said force transmitting means comprising a tiller rotatably and yieldably mounted in said vehicle body, cable means operatively connected to said tiller and to each of said arms and actuator means operated by said vehicle operator to turn said tiller in either direction to selectively swing either of said arms downwardly to thereby camber said vehicle.

2. A three wheel cambering vehicle comprising a vehicle body, steerable wheel means movably secured to said body for turning movement about a steering axis, steering means for turning said steerable wheel means, a pair of arms extending longitudinally of said body, pivot means independently mounting each of said arms for upward and downward swinging movement with respect to said body, a road wheel rotatably mounted on each of said arms for swinging movement therewith, each of said arms having a crank extending therefrom, seat means supporting a vehicle operator within said body at a low center of gravity, force transmitting means independent of said steering means operatively connected to each of said cranks and actuated by said vehicle operator to permit the vehicle operator to selectively impress a load to turn either of said trailing arms on said pivot means to camber said wheels and said vehicle, said force transmitting means comprising a first tiller rotatably and yieldably mounted in said vehicle body, first cable means having an intermediate portion secured to said first tiller and having one end portion connected to one of said cranks and the other end connected to the other of said cranks, a second tiller means rotatably supported in said vehicle, means drivingly connecting said first and second tiller means, an endless cable means secured to said second tiller means, and foot pedal means operatively connected to said endless cable means so that said operator can turn said tillers in either direction and selectively swing either of said arms downwardly to thereby camber said vehicle.

3. A steerable narrow track vehicle having a camber control system independent of steering comprising a vehicle body, steerable wheel means operatively supported by said body for limited turning movement about a substantially vertical steering axis, manual steering means operatively connected to said steerable wheel means for turning said steerable wheel means about said steering axis, a pair of arms extending longitudinally rearwardly from said body, pivot means securing said arms for limited swinging motion with respect to said body independent of said manual steering means, separate road wheel means rotatably mounted on each of said arms adjacent to the free ends thereof, connector cable means operatively connecting each of said arms to each other for equal movement in opposite directions, foot support means for receiving the left and right feet of a vehicle operator operatively connected to said connector cable to permit said operator to actuate said connector means and thereby camber said wheel means and said vehicle, and unitary ride control spring means yieldably urging said connector cable means in one direction to thereby urge said wheels supported by said arms into engagement with a supporting surface.

4. A narrow track vehicle comprising a vehicle body, steerable wheel means operatively supported by said body for limited turning movement about a steering axis, manual steering means operatively connected to said steerable wheel means for turning said steerable wheel means, a pair of arms extending rearwardly from said body, pivot means securing said arms for limited upwardly and downwardly swinging motion with respect to said body, separate road wheel means rotatably mounted on each of said arms adjacent to the free ends thereof, cable means operatively connecting each of said arms to each other, circular tiller means operatively connected to said cable means intermediate the ends thereof and unitary ride control spring means supported by said vehicle body and yieldably urging said tiller means in one direction to thereby urge said wheels supported by said arms into engagement with a supporting surface.

5. A steerable three-wheel narrow-track cambering vehicle that is cambered independent of steering comprising a vehicle body, steerable front road wheel means movably secured to said body for turning movement about a steering axis, steering means for turning said steerable front wheel means, a pair of trailing arms within the profile of said body extending longitudinally rearwardly therefrom, pivot means pivotally connecting the forward ends of said arms to said body and independently mounting each of said arms for upward and downward swinging movement with respect to said body, connector means interconnecting said arms for equal arcuate movement in opposite directions, a road wheel rotatably mounted on each of said arms for swinging movement therewith, seat means for supporting a vehicle operator at a low center of gravity position within said vehicle body in front of said trailing arms, said connector means comprising force transmitting means independent of said steering means mechanically interconnecting each of said arms and foot support means operatively connected to said force transmitting means and manually actuated by the feet and legs of said vehicle operator while seated in said seat means to permit the vehicle operator to selectively manually impress a load to swing said trailing arms on said pivot means through equal arcs and in opposite directions to camber said wheels and said vehicle body and thereby roll said vehicle for improved cornering stability for a wide range of vehicle speeds and ride control spring unit means operatively coupled to said connector means for yieldably urging said connector means in a linear direction to thereby urge said wheels supported by said arms into engagement with a supporting surface.

6. A steerable narrow-track cambering vehicle in which cambering is independent of steering comprising a vehicle body, a seat in said body between the front and rear ends thereof to position and support said operator at a low center of gravity point in said vehicle, steerable front road wheel means, manual steering means for steering said front wheel means, a pair of trailing arms longitudinally aligned with and extending rearwardly of said vehicle body and said seat for said operator, a road wheel rotatably mounted on the free end of each of said arms, laterally extending pivot means mounting each of said arms for up and down swinging movement in planes on opposite sides of a central plane through said vehicle and said front wheel means, actuator means independent of said steering means operatively connecting each of said arms together for swinging said arms on said pivot means in opposite directions through equal arcs in opposite directions, said actuator means having foot support means secured thereto and engaged by and operated through the feet of the vehicle operator when positioned in said seat to roll said vehicle body and wheels with respect to a roll axis for maintaining a coordinate turn under steady state conditions for a wide range of vehicle speeds and a ride control spring unit operatively coupled to said actuator means for yieldably urging said connector means in a direction whereby said wheels supported by said arms are urged into engagement with a supporting surface for said vehicle.

* * * * *